United States Patent [19]

Marcantonio

[11] 4,292,160
[45] Sep. 29, 1981

[54] APPARATUS FOR ELECTROCHEMICAL REMOVAL OF HEAVY METALS SUCH AS CHROMIUM FROM DILUTE WASTEWATER STREAMS USING FLOW-THROUGH POROUS ELECTRODES

[75] Inventor: Paul J. Marcantonio, Lexington, Mass.

[73] Assignee: Kennecott Corporation, Stamford, Conn.

[21] Appl. No.: 68,145

[22] Filed: Aug. 20, 1979

[51] Int. Cl.³ .................... C25B 1/00; C25B 11/12; C25B 15/08
[52] U.S. Cl. ............................ 204/237; 204/89; 204/253; 204/257; 204/260; 204/269; 204/275; 204/284; 204/294
[58] Field of Search ............ 204/130, 149, 152, 52 R, 204/151, 89, 301, 51, 1 R, 233, 235–275, 232, 276, 284, 294; 423/55, 56, 57, 58; 210/36, 42 R, 95, 57, 58

[56] References Cited

U.S. PATENT DOCUMENTS

| | | | |
|---|---|---|---|
| 3,180,810 | 4/1965 | Pearce et al. | 204/260 |
| 3,457,152 | 7/1969 | Maloney, Jr. et al. | 204/275 X |
| 3,493,328 | 2/1970 | Nieuwenhuis | 423/56 |
| 3,679,557 | 7/1972 | Gilby et al. | 204/294 |
| 3,766,034 | 10/1973 | Veltman | 204/284 |
| 3,791,520 | 2/1974 | Nieuwenhuis | 210/36 |
| 3,899,405 | 8/1975 | Iverson et al. | 204/149 |
| 4,072,596 | 2/1978 | Moeglich | 204/1 R X |
| 4,118,305 | 10/1978 | Oloman et al. | 204/1 R X |
| 4,172,780 | 10/1979 | Kammel et al. | 204/272 |

*Primary Examiner*—Howard S. Williams
*Attorney, Agent, or Firm*—John L. Sniado; Anthony M. Lorusso

[57] ABSTRACT

A stream containing chromium and other heavy metals is fed through an electrolytic cell having a flow-through anode of lead shot and a flow-through cathode. The stream passes through the lead shot, resulting in the formation of lead chromate at the anode that falls to a trap in the bottom of the cell. Heavy metals such as copper are plated out on the material forming the flow-through cathode.

6 Claims, 3 Drawing Figures

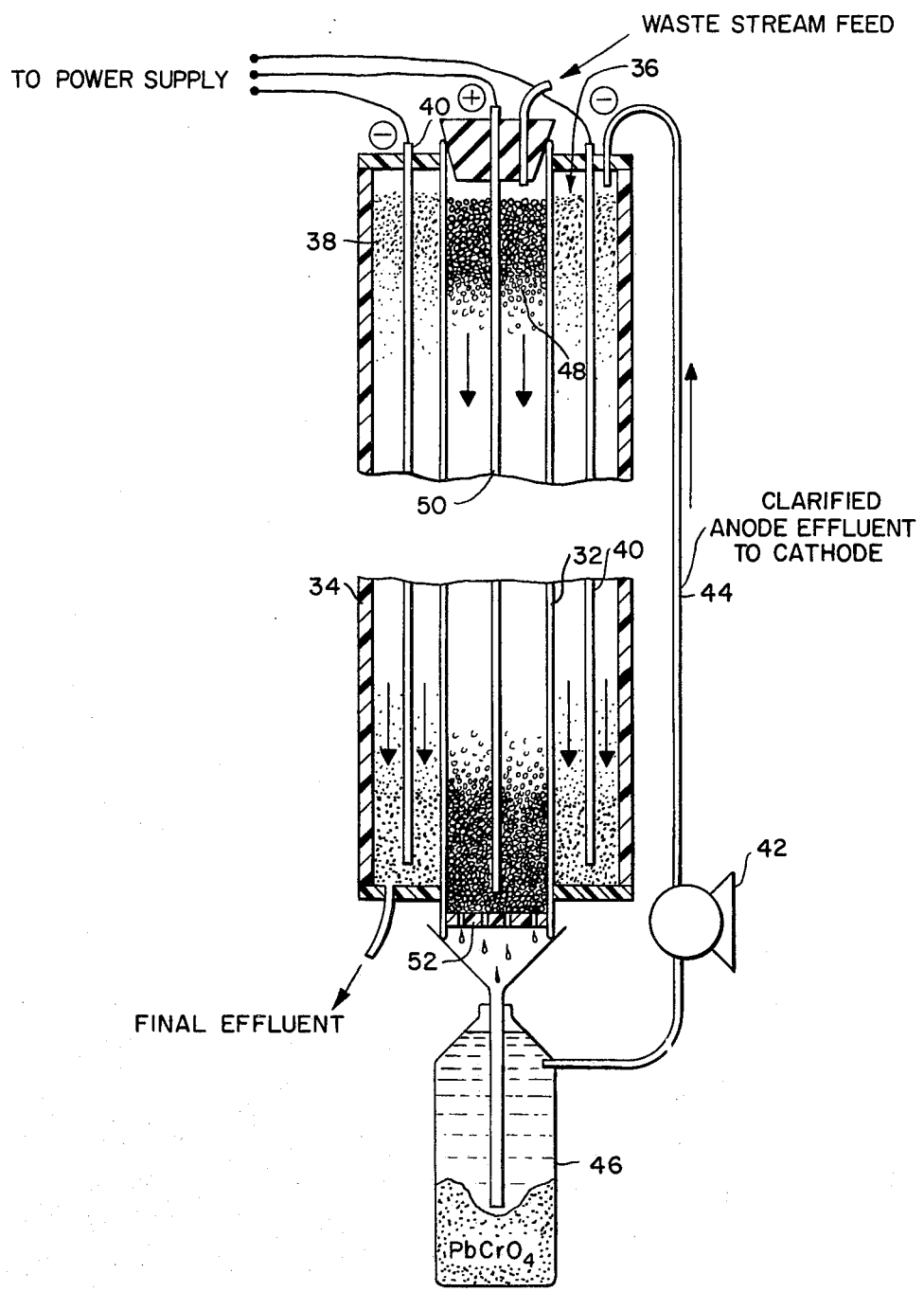

APPARATUS FOR ELECTROCHEMICAL REMOVAL OF HEAVY METALS SUCH AS CHROMIUM FROM DILUTE WASTEWATER STREAMS USING FLOW-THROUGH POROUS ELECTRODES

BACKGROUND OF THE INVENTION

The invention relates to processes for purifying industrial waste streams and more particularly to processes for treating waste solutions electrochemically to remove chromium and other heavy metal ions.

Chromium-containing solutions are used in a number of industries usually for chrome plating steels or for inhibiting corrosion in steel vessels. These solutions are acid solutions having various compositions depending upon the article to be treated. Hexavalent chromium in some form—such as sodium dichromate, sodium chromate, potassium dichromate, potassium chromate, chromium tri-oxide (chromic acid) and the like—is present in these solutions. Because hexavalent chromium is one of the most toxic chemicals to fish life, in even very minute concentrations on the order of one part per ten million, it must be substantially completely removed before treating solution waste waters containing chromium are discharged in a sewage system. Other metals and metal compounds which are found in such treating solutions can be precipitated out by suitably adjusting the pH of the waste waters. Hexavalent chromium, however is soluble at a pH of 0-14 and therefore special methods must be employed to remove it.

There have been various methods proposed to capture chromium before passing waste into a water body or sewer system. For example, U.S. Pat. No. 3,494,328 discloses metering stoichiometric amounts of a lead compound (such as lead nitrate) into a treating bath containing chromate ions to form an insoluble lead chromate. However, as is reported in U.S. Pat. No. 3,791,520, water containing a few parts per million hexavalent chromium was run through a bed containing a particulate insoluble lead compound such as lead oxide or hydroxide. Flow through the bed was very slow due to the formation of insoluble lead chromate which tended to cause packing of the bed. Channeling of the bed also occurred with upward flow of water therethrough with the result that the chromium in the water was not adequately removed.

U.S. Pat. No. 3,791,520 discloses contacting the chromium-laden water with a relatively water insoluble lead compound in conjunction with a porous, particulate matrix which prevents packing and channeling of the insoluble lead compound. The effluent from which the chromium has been removed is then run through a cation exchanger in the hydrogen form to remove any solubilized lead ion.

Removal of chromium from rinse waters by ion exchange methods is well known but is less than satisfactory because of the cost, the fact that the life of the ion exchange resin is short and can only be regenerated a few times before replacement, and because regeneration of the ion exchange resin yields a concentrated chromium solution which still presents a disposal problem.

A well known and commonly used method of removing chromium is to reduce chromium from the hexavalent state to the trivalent state with $SO_2$ and then adjust the pH with calcium hydroxide to precipitate out the trivalent chromium together with relatively large quantities of calcium sulfate (gypsum) sludge. This method suffers from two serious deficiencies: (1) the gypsum has little commercial utility, and (2) the amount of trivalent chromium is usually too small and too contaminated by the gypsum to be of any commercial value. A further disadvantage of the $SO_2$ method is that no free water is obtained that can be recycled for reuse in the metal treating system. Other methods of reducing hexavalent chromium employ sugar, wood, molasses and sawdust and are likewise unsatisfactory because of the production of large amounts of sludge having little or no commercial utility.

With regard to the removal of other metals, electrochemical designs have been tested for nickel or zinc removal in dilute acidic or neutral solutions. In H.S.A. Reactors Ltd., "Metal Finishing Report," November 1977, pp. 26, H.S.A. Reactors Ltd. reported nickel reduction from 132 ppm to 14.5–22.0 ppm using a carbon fiber matrix cathode. This procedure has been termed "direct electrowinning." A fluidized bed "Chemelec" cell as reported in C. L. Lopez-Cacicedo, "The Recovery of Metals from Rinse Waters in 'Chemelec' Electrolytic Cells," Trans. Inst. Metal Finishing, 53, 1975, pp. 74–77, reduced zinc from 523–550 ppm to 333–427 ppm and attempts at nickel reduction were simply termed "inconclusive." By contrast the "Swiss-roll" as reported in P. M. Robertson and N. Ibl, "Electrolytic Recovery of Metals from Waste Waters with the 'Swiss-roll' Cell," J. Appl. Electrochem., 7, 1977, pp. 323–330, was used to selectively recover copper from copper/zinc and copper/nickel mixtures. It was reported that 99.9% of the copper was recovered with no detectable change in the concentration of the second metal.

These results show that complete removal of copper from acidic solutions is possible and significant nickel and zinc removal from dilute acidic solutions is possible when a flow-through cathode is used.

In accordance with the present invention, the direct electrowinning process may be used for the removal of copper and other heavy metals at the cathode and chromate removal at the anode.

Accordingly an object of this invention is to provide an electrochemical method and apparatus for the efficient removal of chromium and other heavy metals from dilute solutions.

SUMMARY OF THE INVENTION

Heavy metals are removed from dilute solutions in an electrolytic cell containing an anode of lead shot in a packed bed. Any flow-through cathode may be used. As the solution passes through the sacrificial lead anode, lead chromate is formed electrochemically in tiny particles which slough off and settle in a trap at the bottom of the cell. Other heavy metals plate out at the cathode.

BRIEF DESCRIPTION OF THE DRAWING

FIG. 3 is a diagrammatic view of a cylindrical cell in accordance with the present invention in which current is perpendicular to solution flow.

DESCRIPTION OF PREFERRED EMBODIMENTS

Figure 1:
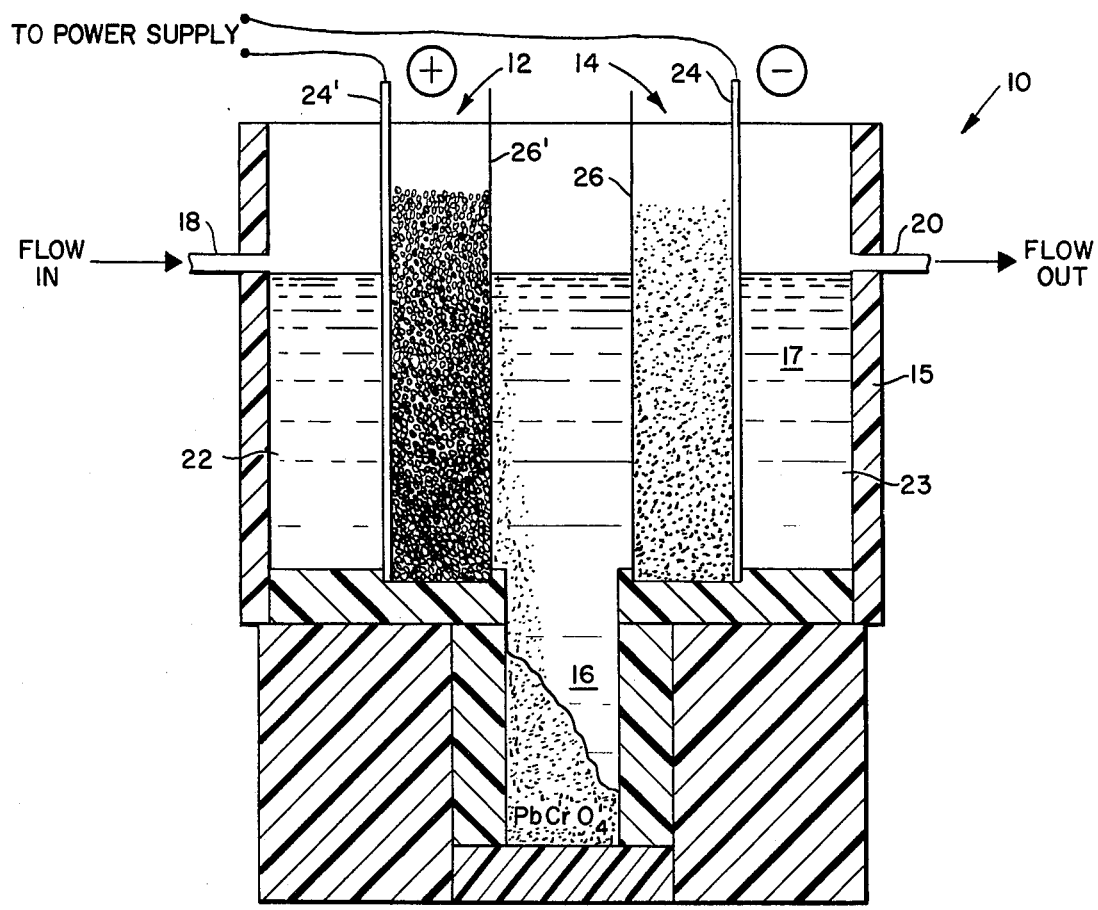
FIG. 1 is a diagrammatic view of an electrolytic cell in accordance with the present invention.

FIG. 1 shows an electrolytic cell 10 made up of two electrodes 12 and 14 in a container 15 for holding electrolyte (waste water) 17. There is an inlet tube 18 feeding liquid through an opening in the upper part of cell container wall 15 at one end of the cell, and an outlet tube 20 connected to an opening in the upper part of a cell container wall at the opposite end of the cell.

One of the electrodes 12 in the cell, near the inlet end of the cell, is an anode of lead shot in the form of a packed bed. The other electrode 14, near the outlet end of the cell, is a cathode of graphite granules or other carbonaceous conductive particles in the form of a packed bed. Each electrode is attached to a terminal, the anode to a positive voltage and the cathode to a negative voltage.

The bottom wall of the cell container includes a trap 16, a cavity formed to be below the surface on which the electrodes 12 and 14 rest. The trap occupies a major portion of the bottom of the cell between the electrodes.

In use, waste water containing chromate and other heavy metal ions is fed to the cell through the inlet tube 18. Voltage is applied to the electrodes. Effluent is withdrawn through the outlet tube 20.

The chromate ion in solution combines with the lead in the anode to form lead chromate. The anodic reaction is thus:

$$Pb + CrO_4^{-2} \rightarrow PbCrO_4 \downarrow + 2e-$$

The cathodic reaction is the deposition of a metal such as Cu, Ni or Zn. The lead chromate is formed as tiny particles that settle in the trap at the bottom of the cell, from which they may be removed.

In a test of a cell like that shown in FIG. 1, a feed solution containing 200 ppm (parts per million) each of $Cu^{+2}$, $Ni^{+2}$, $Zn^{+2}$, and $Cr^{+6}$, was run through the cell. The voltage across the electrodes was 8 volts. After several hours, steady state conditions were reached, giving the effluent concentrations below for two experiments:

| Flow Rate (ml/min.) | Cell Amps | Effluent Concentration (ppm) | | | | | |
|---|---|---|---|---|---|---|---|
| | | Cu | Ni | Zn | $Cr^{+6}$ | Cr Total | Pb |
| 2 | 0.05 | <0.5 | 30 | 35 | <0.5 | <0.5 | 50 |
| 8 | 0.09 | 90 | 165 | 160 | <0.5 | 30 | 1 |

Lead went into solution only after complete removal of $Cr^{+6}$, but was partly removed by reduction at the cathode. It was found that lead chromate ($PbCrO_4$) was not produced from solutions containing only $Cr^{+6}$, but that other metals ($Cu^{+2}$, $Ni^{+2}$, $Zn^{+2}$, or $Na^+$) were required for some kind of catalytic action. Thus, an aspect of the invention is to include a cation to promote the reaction of lead chromate if other cations are not present in the waste stream. If heavy metals such as copper, nickel, cobalt, zinc, silver, gold, cadmium, etc. are not present along with the chromate ion, a cation is actually added to promote lead chromate formation. A preferred cation for addition to the waste water is sodium because it is not expensive and need not be removed from solution.

Solutions were prepared with analytical reagent-grade chemicals of cupric nitrate, nickelous nitrate, zinc sulfate and technical-grade chromic acid ($CrO_3$) to produce a starting solution of 200 ppm each of $Cu^{+2}$, $Ni^{+2}$, and $Cr^{+6}$ on which to test the process and apparatus of the invention. Such solutions have a natural pH of 2.3 (the acidity due almost entirely to chromic acid) and a conductivity of $\sim 3 \times 10^{-3}$ (ohm cm)$^{-1}$.

Two kinds of particulate graphite were used. The first from Asbury Graphite Mills, Inc. (grade 4228) containing 99.4% C, the main impurities being $SiO_4$, CaO, S, $Fe_2O_3$ and $Al_2O_3$ in decreasing order. The second was a high-purity graphite from Ultra Carbon Corp. which contained only 2.5 ppm total metallics. Size fractions of $10 \times 20$ mesh or $10 \times 40$ mesh were used for all tests.

The lead shot was of technical grade which had not been analyzed for impurities. Only in the cylindrical cell of FIG. 3 was ⅛" diameter shot used. All other tests used 1/16" diameter shot.

The basic cell as shown in FIG. 1 consisted of an open-top Plexiglass cube approximately 4" on a side. A packed graphite bed acted as a cathode and was supported by a perforated plate or screen 24 (stainless steel, lead-antimony, graphite which functioned as the current collector and was attached to the negative terminal) and a plastic screen 26. Similar screens 24' and 26' supported the lead shot anode. Thus, plate 24' functioned as the anode current collector and was attached to the positive terminal. Screens 26, 26' and frames 24, 24' containing the packed beds provided an exposed superficial area of 52 cm² to the water line for each bed. The submerged bed volume was 140 cm³ for each bed. Variations of this design are mentioned below as they apply to specific tests.

Figure 2:
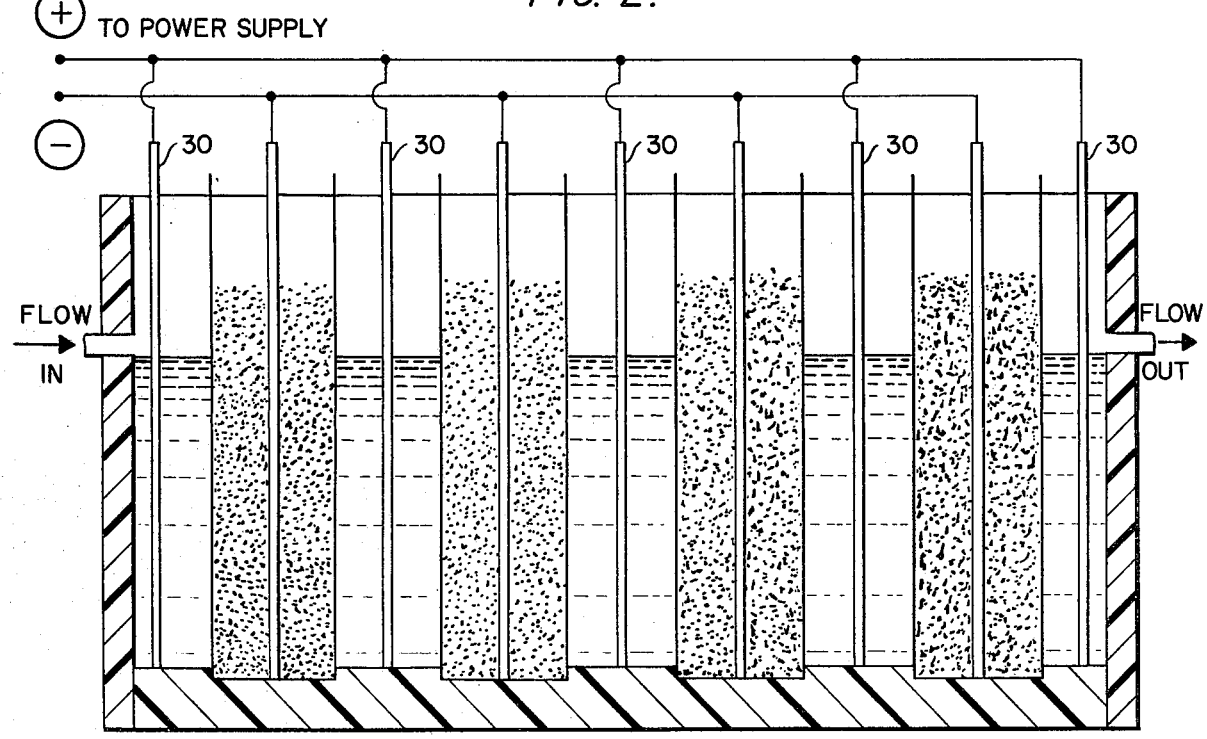
FIG. 2 is a diagrammatic view of a four-stage cell used to conduct tests on the electrodeposition of non-chromium metals.

The second cell design, used to investigate reactions in multiple stages, is shown on FIG. 2. As in the single-stage cell of FIG. 1, solution flow and current were in the same direction (parallel geometry). No chromium solutions were used when operating this cell so that lead shot anodes were unnecessary and were substituted by single, perforated graphite plates as anodes 30.

The third cell design consisted of two concentric cylinders as shown in FIG. 3. The inner cylinder 32, a porous tube of Vycor (Corning Glass Co.) or ceramic (Coors Porcelain Co.) allowed electrical contact without mixing of anolyte and catholyte. A Plexiglas cylinder 34 formed the housing for the cell. The annular space 36 between housing 34 and porous cylinder 32 was filled with conductive particles 38 such as graphite chips. Two or more symetrically spaced negative current collectors (graphite rods) 40 were positioned within the annular space 36 in electrical contact with chips 38. A pump 42 and a conduit 44 delivered chromate free solution from a reservoir 46 to the annular space 36. The porous tube 32 was filled with lead shot 48 and was in electrical contact with a positive current collector (graphite rod) 50.

In operation, solution to be treated is delivered through the waste stream feed to the anode (bed or lead shot) 48. With the current on, lead chromate forms on the lead shot and is carried to the bottom of the cylinder 32 with the flow of the waste stream feed. A grid 52 maintains the bed of lead shot but allows passage of the lead chromate. Other metals plate out on the flow through cathode (chips 38), which can be removed for metal recovery. The cylindrical configuration operates with solution flow at right angles to current (perpendicular geometry).

Cells designed with "parallel" geometry are simpler to engineer and easier to handle physically, but suffer from the fact that most of the reaction takes place within the first ⅛" of the bed where the solution potential is highest. Solution past the "reaction zone" will react very little, and a minimum obtainable metal concentration may not be realized.

Alternatively if the direction of fluid flow is perpendicular to the current, a cell results such that the reaction zone is thin, as seen by the counter electrode (giving a high and relatively uniform solution potential) and long, as seen by the flowing fluid (giving an adequate residence time). The cylindrical cell of FIG. 3 has this type of "perpendicular" geometry.

The complexity of electrochemical reactions and reactors lead to a long list of variables, some of which are interrelated:

| | |
|---|---|
| Cell voltage | Solution additives |
| Cell current | pH |
| Current density | Solution conductivity |
| Electrode potential | Cell geometry |
| Flow rate | Electrode materials |
| Flow direction | Particle size |

For packed-bed, parallel geometry reactors, literature indicates that the variables in the left column are the most critical. Also, for a given cell and solution under steady state conditions, the first four variables are completely dependent on each other and can be fixed and controlled by holding any one constant. Therefore, the first set of meaningful experiments was run to test the influence of cell voltage, flow rate and flow direction on metal removal from solution. Eight tests were run in factorial design fashion and are described more fully below by the following non-limiting examples.

Results of these initial tests showed essentially complete removal of copper and chromium.

Test 1-15

During these tests it was established that chromium formed an insoluble $PbCrO_4$ at the lead anode.

Tests 16-23

These eight tests were designed factorially to show the effects of cell voltage, flow rate and flow direction. Test conditions were as follows:

| | |
|---|---|
| Cell design: | cf. FIG. 1; 1-inch space between anode and cathode; ¾-inch plexiglass plug in sections 22 and 23 to reduce residence time. |
| Solution: | 200 ppm each $Cu^{+2}$, $Ni^{+2}$, $Zn^{+2}$, $Cr^{+6}$; $H_2SO_4$ added to adjust pH from 2.3 to 2.0. |
| Anode: | Pb shot; 1/16-inch diameter |
| Cathode: | Asbury #4228 (10 × 20 mesh) |
| Cell voltage: | 2 and 8 volts |
| Flow rate: | 2 and 8 ml/min |
| Flow Direction: | anode-to-cathode (A → C) and cathode-to-anode (C → A) |

In this cell, 8 volts is just below the point where copious amounts of hydrogen gas were evolved.

Significant findings of this test series were:

1. $Cr^{+6}$ was effectively removed from solution (<1 ppm) at the anode by precipitation of $PbCrO_4$. Once the solution was depleted of $Cr^{+6}$, lead was solubilized and in some cases, reached concentrations >200 ppm.

2. Low flow and high voltage were more effective in metal removal but commercially would be more expensive in terms of power cost and equipment sizing. Higher voltage also tended to solubilize more lead.

3. The response of $Cr^{+6}$ removal was unexpectedly faster at the low voltage. Anodic passivation of lead is known to occur and could explain the slower kinetics at the high voltage.

4. A→C flow direction was much more effective in metal removal than C→A. An added advantage was that most of the lead which was solubilized at the anode was subsequently reduced at the cathode.

5. In two tests, $Cu^{+2}$ effluents were reduced to <0.5 ppm. $Ni^{+2}$ and $Zn^{+2}$ could be reduced to <100 ppm only under conditions in which lead concentration became appreciable.

Tests 24-27

These tests, in a slightly modified cell and fine sized high-purity graphite, extended the operating range of variables from the previous set of tests. Also more attention was given to quantifying compositions of solid products and final effluents.

Test conditions were as follows:

| | |
|---|---|
| Cell design: | cf. FIG. 1; ¼-inch space between anode and cathode; ¾-inch plexiglass plug in sections 22 and 23 to reduce residence time. |
| Solution: | 200 ppm each $Cu^{+2}$, $Ni^{+2}$, $Zn^{+2}$, $Cr^{+6}$; $H_2SO_4$ added to adjust pH from 2.3 to 2.0; $SO_4$ = concentration 707-757 ppm. |
| Anode: | Pb shot; 1/16-inch diameter |
| Cathode: | Ultra Carbon EX-105 (10 × 40 mesh) |
| Flow direction: | A → C |
| Cell voltage: | 2 and 10 volts |
| Flow rate: | 3 and 12 ml/min. |

This higher voltage and shorter A–C spacing gave a low enough cathode potential such that hydrogen evolution was very evident at the strongly reducing cathode face.

Steady-state conditions and results are given in Table IV.

TABLE IV

Conditions and Results of Tests 24-27

| Test # | Cell Voltage (V) | Cell Current (amps) | Flow Rate (ml/min) | Current Efficiency (%) |
|---|---|---|---|---|
| 24 | 10 | 0.16 | 12 | 133 |
| 25 | 10 | 0.10 | 3 | 144 |
| 26 | 2 | 0.042 | 12 | 260 |
| 27 | 2 | 0.030 | 3 | 147 |

| Effluent Concentration (ppm) | | | | | | | Effluent |
|---|---|---|---|---|---|---|---|
| Cu | Ni | Zn | $Cr^{+6}$ | $Cr_T$ | Pb | $SO_4$ | pH |
| 120 | 140 | 140 | 18 | 52 | <0.5 | 282 | 3.6 |
| 2 | 15 | 14 | <1 | 2 | 52.0 | <25 | 5.4 |
| 170 | 195 | 190 | 27 | 90 | <0.5 | 523 | 3.2 |
| 100 | 200 | 195 | <1 | 90 | 6.0 | 624 | 2.5 |

Only in test 25 was the current high enough to remove theoretically all metals in solution assuming the formation of $PbCrO_4$. However, the solids analysis showed that little, if any, $PbCrO_4$ was formed but rather that $Cr(OH)_3$ and hydrolysis products of Cu, Ni and Zn precipitated at the higher pH. This result confirms previous observations that high voltages appear to inhibit $PbCrO_4$ formation.

It should be noted that x-ray analysis confirmed the presence of $PbSO_4$ as well as $PbCrO_4$. These two compounds account for nearly all lead present in the solids except test 25 where some hydroxide is suspected. Hydroxides in general were often noticed on the face of the cathode bed where hydrogen gas evolution apparently depleted the solution of enough hydrogen ions to precipitate hydroxides in localized regions of high pH—higher than observed in the effluent.

The fact that all current efficiencies are greater than 100% showed that hydrolysis, scavenging by $PbCrO_4$, adsorption by graphite or some other non-electrochemical form of metal removal was operative. An adsorption test was done with a sample of Asbury #4228 using the standard 200 ppm solution. After three days a sample was taken and stripped with a solution of $H_2SO_4$ at pH 0.4. The results, Table VI, show that, with the possible exception of chromium ($CrO_4^{-2}$), adsorption would not be detectable within the normal scatter of experimental error.

TABLE VI

Adsorption Test on Asbury #4228 Graphite

| Graphite | Chemical Analysis (ppm) | | | |
|---|---|---|---|---|
| | Cu | Ni | Zn | $Cr_T$ |
| Initial | 5.7 | 3.4 | 2.3 | 5 |
| Loaded | 13.3 | 5.6 | 3.8 | 45 |
| Difference | 7.7 | 2.1 | 1.5 | 40-45 |
| Stripped | 1.2 | 2.9 | 1.8 | 13 |

Tests 28-31

These tests were intended to demonstrate chromium removal from solutions containing 200 ppm $Cr^{+6}$ only. It was found that $PbCrO_4$ was not formed at all presumably due to a corrosion inhibiting or passivating effect of chromate ion on the lead surface. However, when drops of solution containing Cu, Ni, Zn or Na were added to the top of the anode bed, giving an overall solution concentration of about 50 ppm, $PbCrO_4$ formation was immediate. Since industrial chrome plating baths contain no other metallic cations, the above observation indicates that chromium waste streams must be combined with other metalcontaining streams for successful chromate removal.

Tests 32-34

These tests were designed to study the removal of Cu, Ni and Zn in a multi-stage reactor. Unlike previous tests where cell voltage was fixed, these tests were run at constant current noting that the theoretical current required for complete cathodic removal of metals was 0.93 amps. Test conditions were as follows:

| | |
|---|---|
| Cell design: | cf. FIG. 2 |
| Solutions: | 200 ppm each $Cu^{+2}$, $Ni^{+2}$, $Zn^{+2}$; pH 5.3 |
| Anodes: | Perforated graphite plates |
| Cathodes: | UltraCarbon Ex-105 (10 × 40 mesh) |
| Flow rate: | 30 ml/min |
| Cell Current: | 1, 2 & 3 amps |

Steady state conditions and results are given in Table VII.

TABLE VII

Conditions and Results of Tests 32-34

| Test # | Cell Current (amps) | Cell Voltage (V) | Current Efficiency (%) | Effluent Conc. (ppm) | | | Effluent pH |
|---|---|---|---|---|---|---|---|
| | | | | Cu | Ni | Zn | |
| 32 | 1.0 | 3.0 | 35 | <0.5 | 190 | 180 | 2.4 |
| 33 | 2.0 | 5.0 | 26 | <0.5 | 129 | 128 | 2.4 |
| 34 | 3.0 | 7.5 | 21 | <0.5 | 93 | 91 | 2.3 |

These results show the relative ease of copper removal and the difficulty of nickel and zinc removal. Samples at each stage showed that nickel and zinc concentrations decreased after each successive stage but to a lesser degree implying that a large number of stages would be required to get below the 1 ppm level.

It was observed in the case of copper, that precipitation occurred all the way through the third cathode bed, but only about ⅛-inch penetration on the other cathodes. Also precipitation appeared heavier at the bottom than at the top.

Certain hydrolysis products were also noted in tests 33 and 34: a bluish precipitate in the front end (high pH region) and a greenish precipitate in the back end (low pH region). The former was identified by x-ray diffraction principally as $Cu(OH)_2$ with some NiOOH. Note that nickel was oxidized to the +3 state. A third near-amorphous phase was also present which could not be identified. Hydroxides again were formed in localized regions of high pH even though the equivalent production of anodic oxygen was greater than cathodic hydrogen resulting in a net drop in average pH from 5.3 to about 2.4.

Some breakdown of the anode plate was noted in test 34 where the solution became cloudy black with near-colloidal particles of carbon.

Tests 35-36

These were exploratory experiments intended to test the materials and "perpendicular geometry" concept of the cylindrical reactor, FIG. 3. Test conditions were as follows:

| | |
|---|---|
| Cell design: | cf. FIG. 3 |
| Solutions: | 200 ppm each $Cu^{+2}$, $Ni^{+2}$, $Zn^{+2}$, $Cr^{+6}$; pH 2.3 |
| Inner tube: | Test 35: Porous Vycor |
| | Test 36: Porous alumina |
| Anode: | Pb shot; ⅛-inch diameter |
| Cathode: | Asbury #4228 (10 × 40 mesh) |
| Flow rate: | 30 ml/min |
| Cell current: | 1 amp |

In test 35 after about 2 hours operation, effluent concentrations reached a minimum of 0.5 ppm $Cr^{+6}$, 30 ppm $Cu^{+2}$, 145 ppm $Ni^{+2}$ and 135 ppm $Zn^{+2}$, after which all concentrations began to rise. After disassembling the cell, it was found that the Vycor tube cracked.

Test 36 with the porous alumina tube was more successful in holding up physically with no apparent cracking or decrepitation. Effluent concentrations reached a minimum at about 3 hours of <0.1 ppm $Cr^{+6}$, 30 ppm $Cu^{+2}$, 120 ppm $Ni^{+2}$ and 110 ppm $Zn^{+2}$ after which they began to rise. It was noted that interstices between the #4 lead shot eventually filled with $PbCrO_4$ raising the voltage from 7 to 20 volts and inhibiting both solution flow and the anodic reaction. Larger balls of shot would relieve these problems.

ELECTROCHEMICAL THEORY

Voltage Requirements

When any electrochemical whole-cell reaction takes place the total voltage ($V_T$) measured across the operating reactor is actually the sum of several components.

$$V_T = \phi_{cell} + |\eta_c| + \eta_a + IR \quad (1)$$

where $\phi_{cell}$ = electromotive force (emf) of the whole cell reaction calculated from the Nernst equation.

$\eta_c$ = diffusion (concentration) or charge-transfer overpotential at the cathode surface. Absolute values are necessary since the cathodic over-potential is always negative.

$\eta_a$ = diffusion (concentration) or charge-transfer overpotential at the anode surface.

$IR$ = ohmic potential drop due to resistance to ionic mobility through solution.

Several important points should be noted here. First, the ohmic potential drop is linear across the anode—cathode space (l) and is dependent on the superficial current density, i.e., the current density with respect to the projected area of the electrode face (A), not the specific areas of the graphite particles themselves Thus, $$R = \frac{1}{k} \frac{l}{A} \quad (2)$$

where $k$ = specific conductivity (ohm cm)$^{-1}$

Within a porous bed, the ohmic term and in fact the entire solution potential becomes more complicated. The conductivity also changes as the solution becomes depleted with the reaction zone, unless sufficient supporting electrolyte is present to maintain a high level. In the absence of supporting electrolyte, the specific conductivity of the standard 200 ppm solution was about 0.003 (ohm cm)$^{-1}$. For the cell shown in FIG. 1, hydrogen evolution was noted at about 0.1 amp resulting in the following ohmic potential drop:

$$V_\Omega = IR = \frac{I}{k} \frac{l}{A} \quad (3)$$

$$V_\Omega = \frac{0.1 \text{ (amp)}}{0.003 \text{ (ohm cm)}^{-1}} \frac{2.54 \text{ (cm)}}{51.6 \text{ (cm)}^2} \quad (4)$$

$$V_\Omega = 1.6 \text{ volts} \quad (5)$$

Second, the anodic and cathodic overpotentials, in contrast to the ohmic drop, depend on the current density with respect to individual particles. The mathematical analysis of electrode potential, current density and distribution in flow-through electrodes is complicated and has been worked out only in the last few years.

Most commercial metal plating is done under conditions of diffusion (concentration) control where the diffusion overpotential is given by $$\eta_d = \frac{RT}{nF} \ln \frac{C_s}{C_b} \quad (6)$$

where $R$ = gas constant (8.314 joule.°K.$^{-1}$)
$T$ = absolute temperature (°K.)
$n$ = number of electrons in half-cell reaction
$F$ = Faraday constant (96,487 coulomb. mole$^{-1}$)
$C_s$ = metal concentration at electrode surface (mole. cm$^{-3}$)
$C_b$ = metal concentration in bulk solution (mole. cm$^{-3}$)

For metallic reduction reactions, $\eta_d$ reaches a maximum of about 0.05 volts at which point its limiting current density, il, is reached, and the metal is being reduced as fast as it possibly can.

$$il = \frac{nFDC_b}{\delta} \quad (7)$$

where $D$ = diffusivity (~0.001–0.005 cm$^2$·sec$^{-1}$)
$\delta$ = diffusion layer thickness (~0.05 cm)

When the voltage limit is exceeded, hydrogen gas also begins to evolve whose overpotential is typically in the range 0.5–1.0 volts, about the same as that of oxygen evolution at the anode. Since il is directly proportional to $C_b$, it is evident that in very dilute solutions the limiting current density is small so that in order to reach effluents <1 ppm it may be necessary to "overkill" the system with current, thus driving up the cell voltage, evolving much hydrogen and reducing current efficiency.

Third, it should be noted the $\phi_{cell}$ is the minimum voltage required for a reaction to go. It is the sum of the two half-cell reactions calculated from the Nernst Equation and is based entirely on thermodynamics and is therefore current independent. A list of the standard electrode potentials, $\phi_{cell}$, for the various half cell reactions observed in this study are useful for putting into perspective the reactions which are thermodynamically favored over others. Table IX is given in terms of reduction potentials which correspond to unit activity of the ions concerned, but are often, as a rough approximation, equated to potentials for unit concentration. The sign convention is such that a positive potential indicates that the reaction is thermodynamically spontaneous.

TABLE IX
Standard Electrode Reduction Potentials

| Electrode Reaction | $\phi°$ (volts) |
| --- | --- |
| $Cr^{+2} + 2e^- \rightarrow Cr$ | −0.91 |
| $Zn^{+2} + 2e^- \rightarrow Zn$ | −0.763 |
| $Cr^{+3} + 3e^- \rightarrow Cr$ | 0.74 |
| $PbCrO_4 + 2e^- \rightarrow Pb + CrO_4^{-2}$ | −0.499 |
| $Cr^{+3} + e^- \rightarrow Cr^{+2}$ | −0.41 |
| $Ni^{+2} + 2e^- \rightarrow Ni$ | −0.250 |
| $CrO_4^{-2} + 4H_2O + 3e^- \rightarrow Cr(OH)_3 + 5OH^- (pH > 6)$ | −0.13 |
| $Pb^{+2} + 2e^- \rightarrow Pb$ | −0.126 |
| $2H^+ + 2e^- \rightarrow H_2$ | +0.000 |
| $Hg_2Cl_2 + 2e^- \rightarrow 2Hg + 2 Cl^-$ (Satd KCl) | +0.245 |
| $Cu^{+2} + 2e^- \rightarrow Cu$ | +0.337 |
| $O_2 + 4H^+ + 4e^- \rightarrow 2H_2O$ | +1.229 |
| $Cr_2O_7^{-2} + 14H^+ + 6e^- \rightarrow 2Cr^{+3} + 7H_2O$ (pH 1-6) | +1.33 |
| $HCrO_4^- + 7H^+ + 3e^- \rightarrow Cr^{+3} + 4H_2O$ | +1.35 |

Three cases will now be considered to show the range over which the minimum voltage requirement can vary for certain whole-cell reactions in wastewater systems. In actual experiments, the ions were not at unit activity but at 3–4×10$^{-3}$ M concentration. By Nerstian calculations the magnitude of overall cell potential (or minimum potential which must be overcome) would be reduced by amount 0.06 volts.

Case I: Thermodynamically Most Favorable Case

| | | $\phi°$ |
|---|---|---|
| Cathode | $Cu^{+2} + 2e^- \rightarrow Cu$ | +0.337 |
| Anode | $CrO_4^{+2} + Pb \rightarrow PbCrO_4 + 2e^-$ | +0.499 |
| Cell | $Cu^{+2} + CrO_4^{-2} + Pb \rightarrow Cu + PbCrO_4$ | +0.836 |

The large positive potential indicates that, barring kinetic restrictions, the reaction is spontaneous and will proceed by itself. However, to keep the reaction going at a desirable fast rate, i.e., to surmount the overpotentials which increase with current, an addition potential may need to be applied.

Case II: Intermediate Case

| | | $\phi°$ |
|---|---|---|
| Cathode | $2 Cu^{+2} + 4e^- \rightarrow 2Cu$ | +0.337 |
| Anode | $2H_2O \rightarrow O_2 + 4H^+ + 4e^-$ | −1.229 |
| Cell | $2Cu^{+2} + 2H_2O \rightarrow 2Cu + O_2 + 4H^+$ | −0.892 |

In comparing Case I and Case II it is apparent that the changed anodic half-cell reaction has made the difference between a reaction which was spontaneous and a reaction which must be driven by about 0.9 volts.

Case III: Thermodynamically Least Favorable Case

| | | $\phi°$ |
|---|---|---|
| Cathode | $2 Zn^{+2} + 4e^- \rightarrow 2 Zn$ | −0.763 |
| Anode | $2H_2O \rightarrow O_2 + 4H^+ + 4e^-$ | −1.229 |
| Cell | $2 Zn^{+2} + 2H_2O \rightarrow 2Zn + O_2 + 4H^+$ | −1.992 |

In commercial zinc electrowinning, the cell voltage is about 3.5 volts showing that in addition to the 2-volt minimum, another 1.5 volts in overpotentials are inherent in the operation and must also be overcome.

In a flow-through system, not only must the voltage requirements be met, but also a sufficient current must be available to remove all metallic ions before they leave the reaction zone or zones if multiple stages are used. The theoretical current required for total metals removal may be easily calculated from Faraday's Law:

$$\frac{m}{M} = \frac{I \, t}{\Delta z F} \quad (8)$$

In a batch or closed system, this equation relates the mass, m, of an element of atomic weight, M, which is reacted at an electrode by $\Delta z$ electrons to the passage of current, I, through the solution for time, t. In a continuous or flow-through system, the mass per unit time is equivalent to a concentration, C, times a flow rate, q, and the theoretical current becomes $$I_{TC} = \frac{F q C \Delta z}{60,000 \, M} \quad (9)$$

where
q [=] cm$^3$ min$^{-1}$
C [=] g·l$^{-1}$
I [=] amp = coulomb. sec$^{-1}$

Theoretical currents assume 100% current efficiency, i.e., no redissolution of metal, no side reactions such as hydrogen evolution, and no non-electrochemical reaction which removes the ion from solution like adsorption or hydrolysis.

It has been shown that in multi-component systems, the current distribution is such that the more noble metal reacts at the front end of the porous electrode while the more active metal reacts at the back end. Thus efficient use may be made of a properly designed electrode even if it is relatively thick (1-2") if several reaction zones are present within it. Furthermore, since reactions are highly sensitive to variations in flow rate, a thick electrode would tend to confine reactions to discrete zones by minimizing hydrodynamic fluctuations like channeling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A cell for removing chromium ions from waste streams comprising:
    a. a container for holding the waste stream to be treated;
    b. an inlet tube into said container for introducing the waste stream into said container;
    c. an outlet tube in said container for delivering a treated waste stream from said container;
    d. a packed bed of lead shot forming an anode near the inlet of said container;
    e. a cathode of conductive carbonaceous particles near the outlet of said container;
    f. means for applying positive voltage to the bed of lead shot;
    g. means for applying negative voltage to the bed of conductive carbonaceous particles; and
    h. a trap for collecting lead chromate which sloughs off the anode as chromate ions react with the lead shot when the stream to be treated is flowed through the cell and voltage is applied to the cathode and anode.

2. The cell as set forth in claim 1 wherein the trap is located below the beds forming the cathode and the anode.

3. The cell as set forth in claim 2 wherein the anode is formed by a current collector forming one support wall for the lead shot and a screen for maintaining the packed bed of lead shot.

4. The cell as set forth in claim 2 wherein the cathode is formed by a current collector forming one support wall for the carbonaceous particles and a screen for maintaining the bed of carbonaceous particles.

5. A cell for removing chromium ions from waste streams comprising:
    a. an inner cylinder formed of a porous material which permits flow of electrolyte but prevents the passage of said particles;
    b. a current collector positioned in said inner cylinder connected to a source of positive voltage;
    c. a column of lead shot within said inner cylinder;
    d. an outer cylinder surrounding said inner cylinder for containing a waste stream to be treated;

e. a bed of conductive carbonaceous material between the outside wall of said inner cylinder and the inside wall of said outer cylinder;

f. a current collector connected to a source of negative voltage in electrical contact with said conductive carbonaceous particles;

g. an inlet for feeding waste streams into said cell located at the top of said inner cylinder;

h. an outlet for removing effluent from said cell located at the bottom of said outer cylinder between the outside wall of said inner cylinder and the inside wall of said outer cylinder; and i. a trap for collecting lead chromate located beneath the bed of lead shot, said bed of lead shot in said trap being separated by a grid which prevents the passage of lead shot but permits the passage of lead chromate.

6. The cell as set forth in claim 5 including a means for circulating waste streams from which chromium ions have been removed from said inner cylinder to the space between said inner cylinder and said outer cylinder.

* * * * *